United States Patent
Surnilla et al.

(10) Patent No.: US 9,797,343 B2
(45) Date of Patent: Oct. 24, 2017

(54) DETERMINING EXHAUST GAS RECIRCULATION COOLER FOULING USING DPOV SENSOR

(71) Applicant: Ford Global Technologies, LLC, Dearborn, MI (US)

(72) Inventors: Gopichandra Surnilla, West Bloomfield, MI (US); Daniel Joseph Styles, Canton, MI (US); James Alfred Hilditch, Canton, MI (US); Imtiaz Ali, Lathrup Village, MI (US); Freeman Carter Gates, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 14/075,787

(22) Filed: Nov. 8, 2013

(65) Prior Publication Data
US 2015/0128916 A1 May 14, 2015

(51) Int. Cl.
F02M 25/07 (2006.01)
F02D 41/00 (2006.01)
F02D 41/14 (2006.01)
F02M 26/49 (2016.01)
F02M 26/08 (2016.01)
F02M 26/45 (2016.01)

(52) U.S. Cl.
CPC ..... F02M 25/0753 (2013.01); F02D 41/0055 (2013.01); F02D 41/0072 (2013.01); F02D 41/144 (2013.01); F02M 26/08 (2016.02); F02M 26/45 (2016.02); F02M 26/49 (2016.02); F02D 2041/0067 (2013.01); Y02T 10/47 (2013.01)

(58) Field of Classification Search
CPC ........... F02M 25/0753; F02M 25/0757; F02M 26/49; F02M 26/45; F02M 26/47; F02D 41/0055; F02D 41/0072; F02D 41/144; F02D 2041/0067; Y02T 10/47
USPC ............ 701/102, 104, 108, 114; 123/568.11, 123/568.12, 568.16
See application file for complete search history.

(56) References Cited

U.S. PATENT DOCUMENTS

| 5,137,004 A | * | 8/1992 | Takahata | F02M 25/0777 73/114.36 |
|---|---|---|---|---|
| 6,363,922 B1 | | 4/2002 | Romzek et al. | |
| 6,826,903 B2 | | 12/2004 | Yahata et al. | |

(Continued)

FOREIGN PATENT DOCUMENTS

| EP | 1808591 A2 | 7/2007 |
|---|---|---|
| WO | 2013030562 A1 | 3/2013 |

*Primary Examiner* — Stephen K Cronin
*Assistant Examiner* — Susan Scharpf
(74) *Attorney, Agent, or Firm* — Julia Voutyras; McCoy Russell LLP

(57) ABSTRACT

Methods and systems are provided for determining degradation of an EGR cooler based on differential pressure across the EGR cooler during EGR flow. In one example, the differential pressure across the EGR cooler may be based on differential pressure across an EGR valve and a pressure downstream from the EGR valve with and without EGR flow. The pressure downstream from the EGR valve may be a compressor inlet pressure or an intake manifold pressure in a low pressure EGR system or high pressure EGR system, respectively.

11 Claims, 7 Drawing Sheets

(56) References Cited

U.S. PATENT DOCUMENTS

| | | | |
|---|---|---|---|
| 6,848,434 B2 * | 2/2005 | Li | F02M 25/0702 |
| | | | 123/568.12 |
| 7,950,377 B2 | 5/2011 | Busato et al. | |
| 8,091,535 B2 * | 1/2012 | Nitzke | F02D 9/04 |
| | | | 123/568.12 |
| 8,596,114 B2 * | 12/2013 | Nam | F02D 41/0077 |
| | | | 73/114.74 |
| 2002/0129799 A1 * | 9/2002 | Wang | F02M 26/48 |
| | | | 123/568.16 |
| 2002/0144674 A1 * | 10/2002 | Wang | F02D 41/0065 |
| | | | 123/568.21 |
| 2012/0096927 A1 | 4/2012 | Freund | |
| 2012/0312001 A1 * | 12/2012 | Nam | F02D 41/221 |
| | | | 60/299 |
| 2013/0061831 A1 | 3/2013 | Gambhir et al. | |
| 2013/0139795 A1 | 6/2013 | Saitoh et al. | |
| 2014/0020362 A1 * | 1/2014 | Warey | F01N 3/08 |
| | | | 60/274 |
| 2015/0233326 A1 * | 8/2015 | Takaki | F02M 25/0712 |
| | | | 123/559.2 |

\* cited by examiner

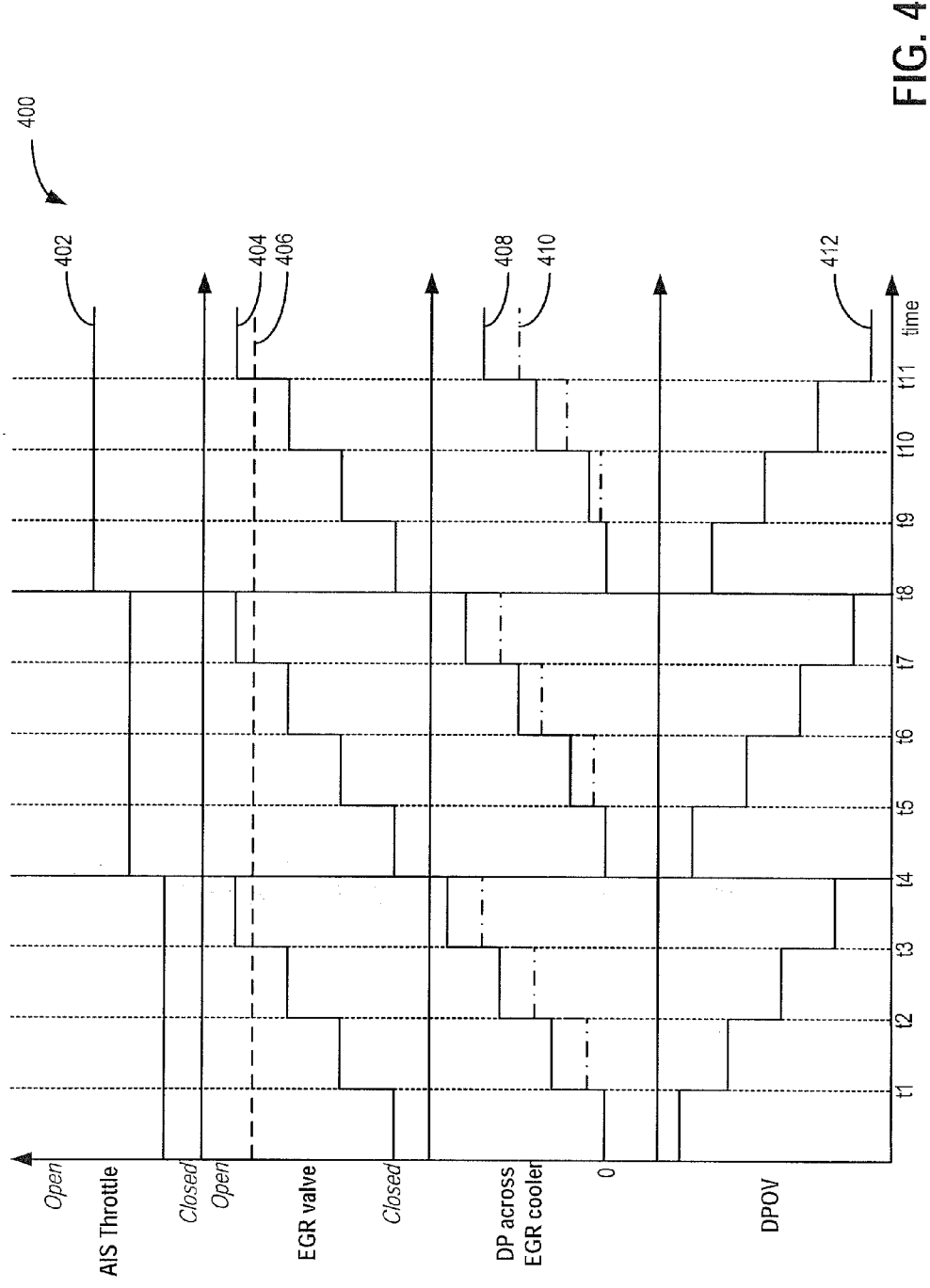

DETERMINING EXHAUST GAS RECIRCULATION COOLER FOULING USING DPOV SENSOR

TECHNICAL FIELD

The present application relates to systems and methods for determining exhaust gas recirculation (EGR) cooler fouling.

BACKGROUND AND SUMMARY

Turbocharged engine systems may include a low-pressure EGR (LP EGR) system which recirculates exhaust gas from the exhaust passage downstream of a turbine to the intake passage upstream of a turbocharger compressor or a high-pressure (HP EGR) system which recirculates exhaust gas from the exhaust passage upstream of a turbine to the intake passage downstream of a turbocharger compressor. Alternatively, EGR may be implemented on a naturally aspirated engine where EGR is taken from the exhaust manifold and injected into the intake manifold. The recirculated exhaust gas may dilute the oxygen concentration of the intake air resulting in reduced combustion temperatures, and consequently, formation of nitrogen oxides in the exhaust may be reduced. LP or HP EGR systems may include an EGR cooler located in an EGR passage that couples an engine exhaust passage to the engine intake system. The EGR cooler may provide cooled EGR gas to the engine to further improve emissions and fuel economy. However, exhaust gas may contain soot, which may accumulate in the EGR cooler over a period of time. The accumulation of soot in the EGR cooler may cause EGR cooler fouling. Consequently, efficiency of EGR cooling may decrease resulting in degraded fuel economy and increased emissions. Further, due to accumulation of soot in the EGR cooler, there may be increased pressure drop across the EGR cooler, which may additionally affect fuel economy and emissions.

One example approach for determining EGR cooler degradation is provided by Freund et al. in US 2012/0096927 A1. Therein, a fouling layer in the EGR cooler is detected based on inlet and outlet pressure of the exhaust gas entering and exiting the EGR cooler, temperature of the exhaust gas exiting the EGR cooler, and inlet and outlet temperature of the EGR coolant entering and exiting the EGR cooler. In the illustrated approach by Freund et al., a detection system for determining EGR cooler fouling includes a first sensor for sensing an inlet pressure of the exhaust gas entering the cooler, and a second sensor for sensing exit pressure of the exhaust gas exiting the EGR cooler.

However, the inventors herein have identified issues with such an approach. For example, two additional sensors, one for sensing the inlet pressure of the exhaust gas entering the cooler and another for sensing the outlet pressure of the exhaust gas entering the cooler are required to determine a differential pressure across the EGR cooler. Further, additional electrical connections and control processes are required to transmit and process signals from the sensors. The additional sensors and connections lead to increased cost and size for implementation of the EGR cooler system.

Therefore, in one example, some of the above issues may be at least partially addressed by a method for an engine, comprising: determining degradation of an exhaust gas recirculation (EGR) cooler based on a change in a differential pressure across the EGR cooler greater than a threshold change, the differential pressure across the EGR cooler determined based on a differential pressure across an EGR valve located downstream of the EGR cooler and a pressure downstream of the EGR valve.

EGR systems employ a differential pressure over valve (DPOV) based measurement system to determine an EGR flow rate. The DPOV system may include a DPOV sensor to determine a differential pressure across an EGR valve located downstream of the EGR cooler. Further, an engine may include one or more EGR systems including one or more of a high pressure EGR (HP EGR) system, a low pressure EGR (LP EGR) system, or a naturally aspirated EGR system. In the LP EGR system, the pressure downstream of the LP EGR valve may be a compressor inlet pressure measured with a compressor inlet pressure (CIP) sensor. In the HP EGR system, the pressure downstream of the HP EGR valve may be an intake manifold pressure measured with an intake manifold pressure (MAP) sensor. The DPOV sensor may be utilized along with a CIP or MAP measurement (depending on the type of EGR system) to determine a differential pressure across the EGR cooler.

For example, when the EGR valve is closed, the differential pressure across the EGR cooler is zero. Therefore, a pressure upstream of the EGR cooler may be determined based on the DPOV sensor measurement and one of the CIP or MAP measurement when the EGR valve is closed. A pressure downstream of the EGR cooler may be determined based on the DPOV sensor measurement and the CIP or MAP when the EGR is flowing (that is, when EGR valve is not closed). Pressure loss or differential pressure across the EGR cooler may be determined based on the measured upstream pressure and the downstream pressure of the EGR cooler. The differential pressure may be calculated at different EGR flow conditions. The determined differential pressure across the EGR cooler may be utilized to determine a change in differential pressure across the EGR cooler compared to differential pressure across a new EGR cooler. EGR cooler fouling may be indicated if the change in differential pressure across the EGR cooler is greater than a threshold change.

In this way, by utilizing the existing DPOV measurement system for EGR cooler fouling determination, additional sensors and connections may not be required. Consequently, cost for implementing the detection system for EGR cooler fouling may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings.

FIG. 4 shows an example EGR degradation determination.

DETAILED DESCRIPTION

Figure 1:
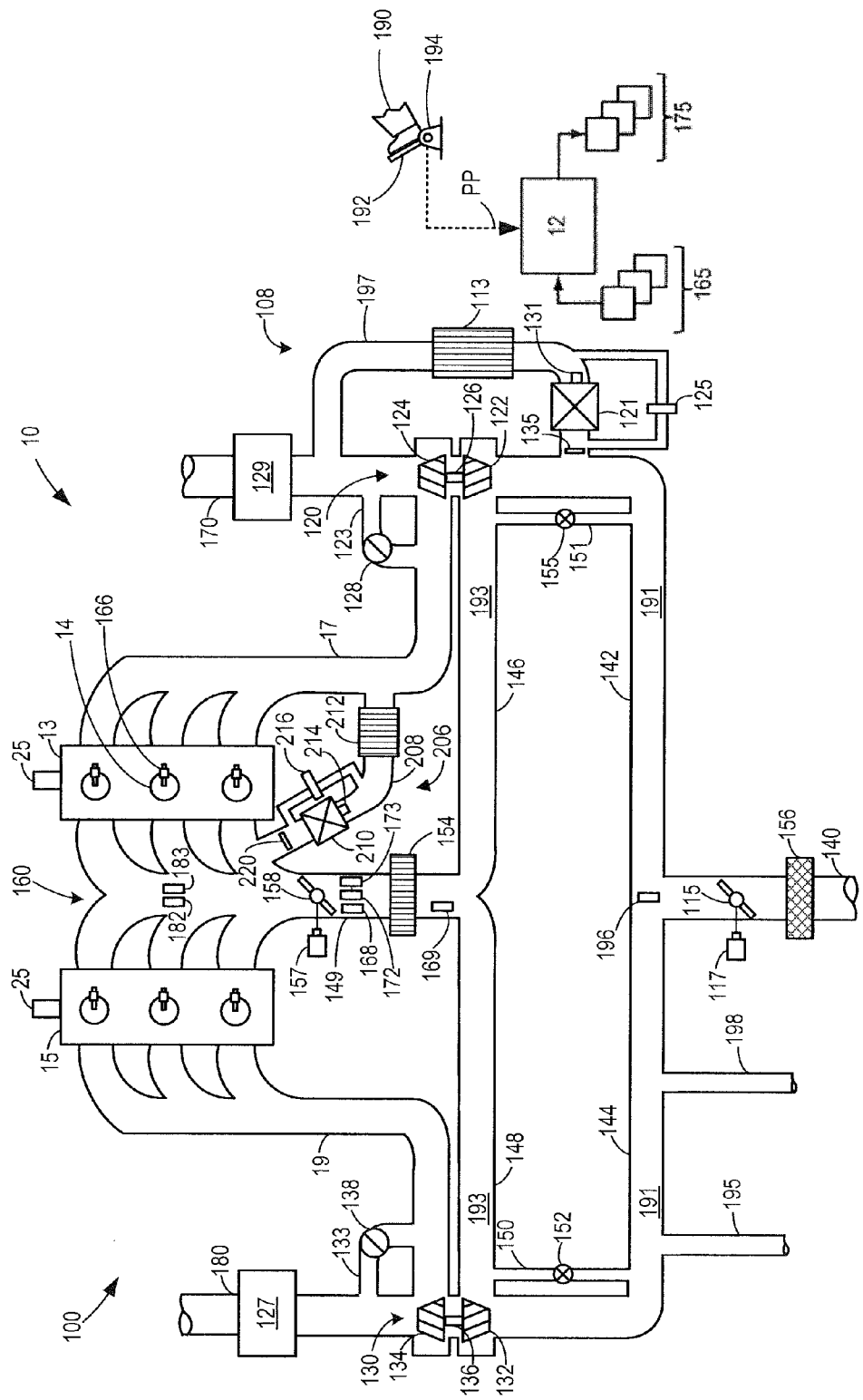
FIG. 1 shows a schematic diagram of a twin-turbocharged engine system, including a low pressure and high pressure EGR system with an EGR cooler.
Figure 2:
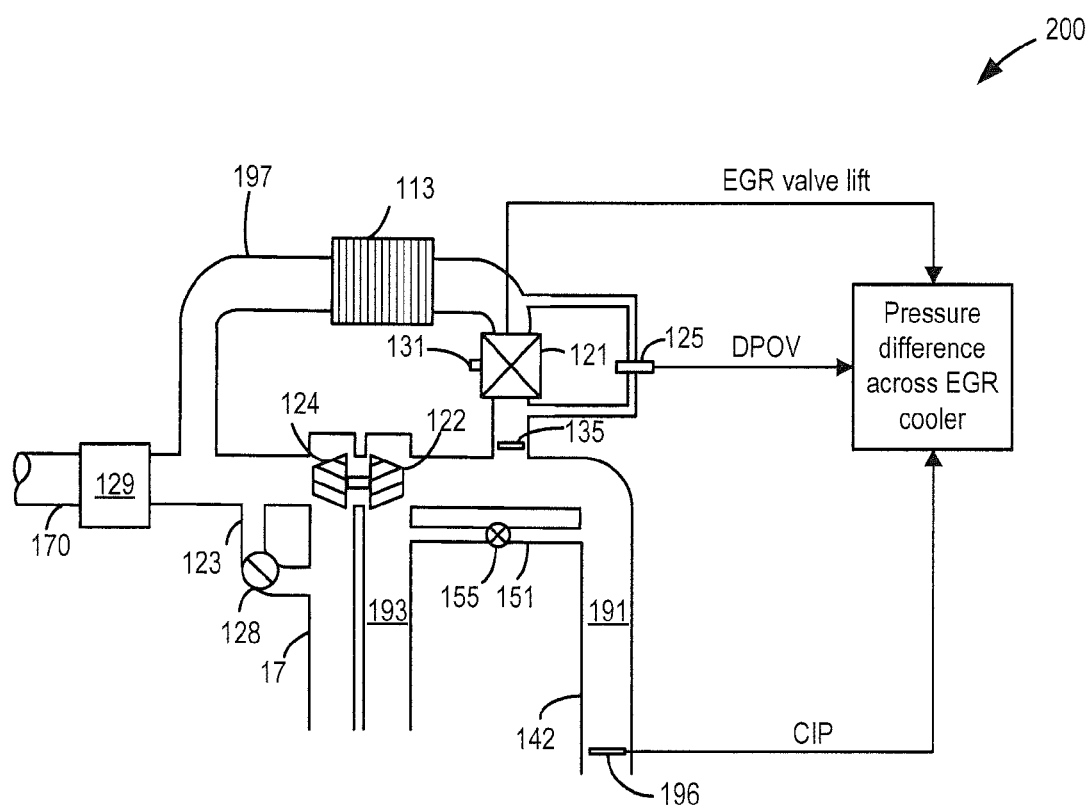
FIG. 2 shows a schematic diagram of the low pressure EGR system of the twin-turbocharged engine system shown at FIG. 1, including signals from the LP EGR system that may be used to determine differential pressure across EGR cooler.

Methods and systems are provided for determining degradation of an EGR cooler based on differential pressure (DP) across an EGR valve and a pressure downstream from an EGR valve in an engine system (such as engine system of FIG. 1). The engine system may include a low pressure (LP) EGR system, a high pressure (HP) EGR system, and/or a naturally aspirated EGR system. In the LP EGR system the pressure downstream from the EGR valve may be a compressor inlet pressure (CIP) and in the HP and naturally aspirated EGR systems the pressure downstream from the EGR valve may be an intake manifold pressure (MAP). DP across the EGR valve and CIP or MAP (depending on the type of EGR system) may be determined based on signals from a differential pressure over valve (DPOV) sensor, and a CIP or MAP sensor, respectively, as shown at FIG. 2. A controller may perform a routine such as the routine at FIG. 3A to determine and indicate EGR cooler degradation. In order to determine EGR cooler degradation, pressure upstream of EGR cooler may be determined as shown at FIG. 3B, pressure downstream of EGR cooler may be determined as shown at FIG. 3C, and a function of differential pressure across the EGR cooler may be determined as shown at FIG. 3D. An example determination of EGR cooler degradation is shown at FIG. 4. It should be noted that while FIGS. 1 and 2 schematically describe a LP and HP EGR system, this concept maybe applied to an engine system including one or more of a LP EGR system, HP EGR system, or naturally aspirated EGR system.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 3A-3D.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 144 upstream of compressor 132, and a downstream end of CBV passage 150 may be coupled with intake passage 148 downstream of compressor 132. Similarly, an upstream end of a CBV passage 151 may be coupled with intake passage 142 upstream of compressor 122, and a downstream end of CBV passage 151 may be coupled with intake passage 146 downstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142. and an HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. EGR cooler 113 may be degraded due to accumulation of soot from the exhaust gases passing through the EGR cooler. EGR cooler degradation may be determined based on pressure measurements from a differential pressure over valve (DPOV) sensor 125 and CIP sensor 196. Details of EGR cooler fouling determination will be further elaborated at FIGS. 2-4.

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In the depicted example, the engine system 100 may also include a HP EGR system 206. HP EGR system 206 routes a desired portion of exhaust gas from common exhaust passage 17, upstream of the turbine 124, to intake manifold 160, downstream of intake throttle 158. Alternatively, the HP EGR system 206 may be positioned between exhaust passage 17 and the intake passage 193, downstream of the compressor 122. The amount of HP EGR provided to intake manifold 160 may be varied by the controller 12 via EGR valve 210 coupled in the HP EGR passage 208. In the example embodiment shown at FIG. 1, HP EGR system 206 includes an EGR cooler 212 positioned upstream of EGR valve 210. EGR cooler 212 may reject heat from the recirculated exhaust gas to engine coolant, for example. EGR cooler 212 may be degraded due to accumulation of soot from the exhaust gases passing through the EGR cooler 212. EGR cooler degradation may be determined based on pressure measurements from a differential pressure over valve (DPOV) sensor 216 and MAP sensor 182. Details of EGR cooler fouling determination will be further elaborated at FIGS. 3-4.

Likewise, the engine may include a second high-pressure EGR loop (not shown) for recirculating at least some exhaust gas from the exhaust passage 19, upstream of the turbine 134, to the intake passage 148, downstream of the compressor 132, or to the intake manifold 160, downstream of intake throttle 158. EGR flow through HP-EGR loops 208 may be controlled via HP-EGR valve 210.

EGR valve 121 and EGR valve 210 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting one or more of the EGR valves 121 and 210 and/or the AIS throttle 115 may adjust and EGR flow amount (or rate) and subsequently a percentage EGR in the mass air flow (e.g., air charge entering the intake manifold).

The EGR dilution percentage of the intake charge at a given time (e.g., the proportion of combusted gases to total flow in an intake passage of the engine) may be inferred from the output of an intake oxygen sensor 168. In the depicted embodiment, the intake oxygen sensor is positioned downstream of air cooler 154. However, in other embodiments, sensor 168 may be arranged at a juncture of intake passages 146, 148, and 149 and upstream of air cooler 154 or at another location along intake passage 149. Intake oxygen sensor (IAO2) 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 121, AIS throttle 115, or other actuators to achieve a desired EGR dilution percentage of the intake charge.

In one example, an EGR flow rate may be estimated based on a differential pressure over valve (DPOV) system which includes a differential pressure sensor (e.g., differential pressure sensor 125 or 216) that detects a pressure difference between an upstream region of EGR valve (e.g., EGR valve 121 or 210) and a downstream region of EGR valve 121 or 210. EGR flow rate determined by the DPOV system may be further based on an EGR temperature detected by an EGR temperature sensor 135 located downstream of EGR valve 121 or an EGR temperature sensor 220 located downstream of EGR valve 210, and an area of EGR valve opening detected by an EGR valve lift sensor 131 or EGR valve lift sensor 214, based on the corresponding EGR system (e.g., HP or LP EGR). In another example, EGR flow rate may be determined based on outputs from an EGR measurement system that includes intake oxygen sensor 168, mass air flow sensor (not shown), manifold absolute pressure (MAP) sensor 182 and manifold temperature sensor 183. In some examples, both the EGR measurement systems (that is, the DPOV system including differential pressure sensor 125 or 216, and the EGR measurement system including intake oxygen sensor 168) may be used to determine, monitor and adjust EGR flow rate.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor or alternatively the mass air flow sensor can be located in common duct 140.

Turning to FIG. 2, a schematic of LP EGR valve assembly and the signals for determining differential pressure across a LP EGR cooler based on DPOV measurement system is illustrated. Differential pressure across the EGR cooler may be determined by utilizing a DPOV measurement system, which includes determination of differential pressure across the EGR valve and compressor inlet pressure (CIP). For example, differential pressure across EGR cooler may be determined as a function of EGR cooler inlet pressure (estimated based on differential pressure across EGR valve and CIP) when EGR is not flowing, and EGR cooler outlet pressure (estimated based on differential pressure across EGR valve and CIP) when EGR is flowing. The EGR cooler inlet pressure when EGR is not flowing may also be referred to as the EGR outlet pressure since the EGR cooler inlet and outlet pressure may be substantially the same when the EGR valve is closed. The determined differential pressure across EGR cooler may be compared to differential pressure across a new EGR cooler to determine a change in differential pressure. Based on the change in differential pressure greater than a threshold pressure change, EGR cooler fouling may be determined.

When EGR is flowing (that is, when the EGR valve is not closed), there may be an increased pressure drop across EGR cooler 113 due to accumulation of soot. For example, pressure at an EGR cooler inlet location upstream of the EGR cooler may be higher than pressure at an EGR cooler outlet location downstream of the EGR cooler. Pressure drop across the EGR cooler may be determined based on a differential pressure signal from a differential pressure sensor 125 that detects a differential pressure across EGR valve 121, and a CIP signal from CIP sensor 196 located upstream of compressor 122 at different EGR flow conditions. Different EGR flow conditions may be obtained by varying an amount of opening of EGR valve 121.

EGR valve 121, located in the EGR passage 197 downstream of turbine 124 and upstream of compressor 122, may be adjusted by the controller to allow a desired amount of EGR into the intake passage 142. An amount of opening of EGR valve 121 may be determined based on an EGR valve lift signal from the EGR valve lift sensor 131.

Further, in some examples, EGR temperature may be utilized along with differential pressure across EGR valve measurement and CIP to determine an efficiency of the EGR cooler. EGR temperature may be determined based on signals from EGR temperature sensor 135. In the example depicted herein, EGR temperature sensor 135 is located downstream of EGR valve 121. In some examples, EGR temperature sensor may be located upstream of EGR valve 121.

The controller may receive EGR valve lift, differential pressure across EGR valve, EGR temperature, and CIP pressure signals from the respective sensors as discussed above to determine pressure drop across EGR cooler based on DPOV measurement system. The determined pressure drop across the EGR cooler may be utilized to determine a change in pressure drop across the EGR cooler compared to pressure drop across a new EGR cooler. Based on the change in pressure drop, EGR cooler degradation may be determined. In some examples, an efficiency of EGR cooler may be determined based on the change in pressure drop, and based on the efficiency of EGR cooler, EGR cooler degradation may be determined.

In this way, EGR cooler degradation may be determined based on signals from the DPOV measurement system. By utilizing pressure signals from the DPOV system and the CIP sensor for measurement of differential pressure or pressure drop across the EGR cooler, additional sensors and connections for the additional sensors may be reduced. Consequently, cost for developing systems for EGR cooler fouling determination may be reduced.

In alternate embodiments, EGR cooler degradation of a HP EGR cooler (e.g., HP EGR cooler 212 shown in FIG. 1) may be determined based on signals from the DPOV system and the MAP sensor (e.g., MAP sensor 182 shown in FIG. 1). Thus, the description of FIG. 2 above may also work for the HP EGR system, but replacing CIP with MAP and replacing the LP EGR system components with the HP EGR system components (as shown in FIG. 1).

Figure 3A:
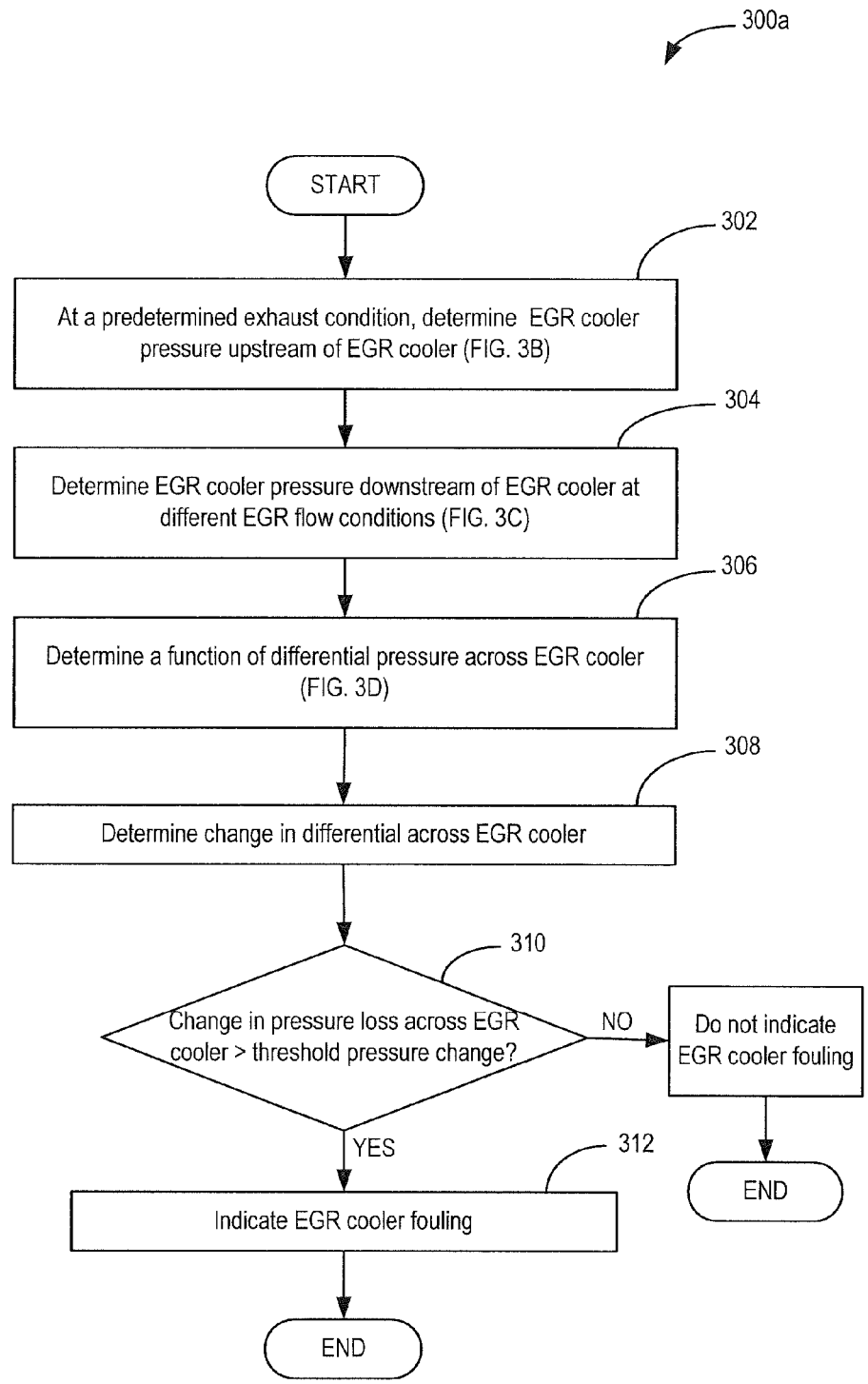
FIG. 3A shows a flow chart illustrating a routine for indicating EGR cooler degradation based on a differential pressure across the EGR cooler.
Figure 3B:
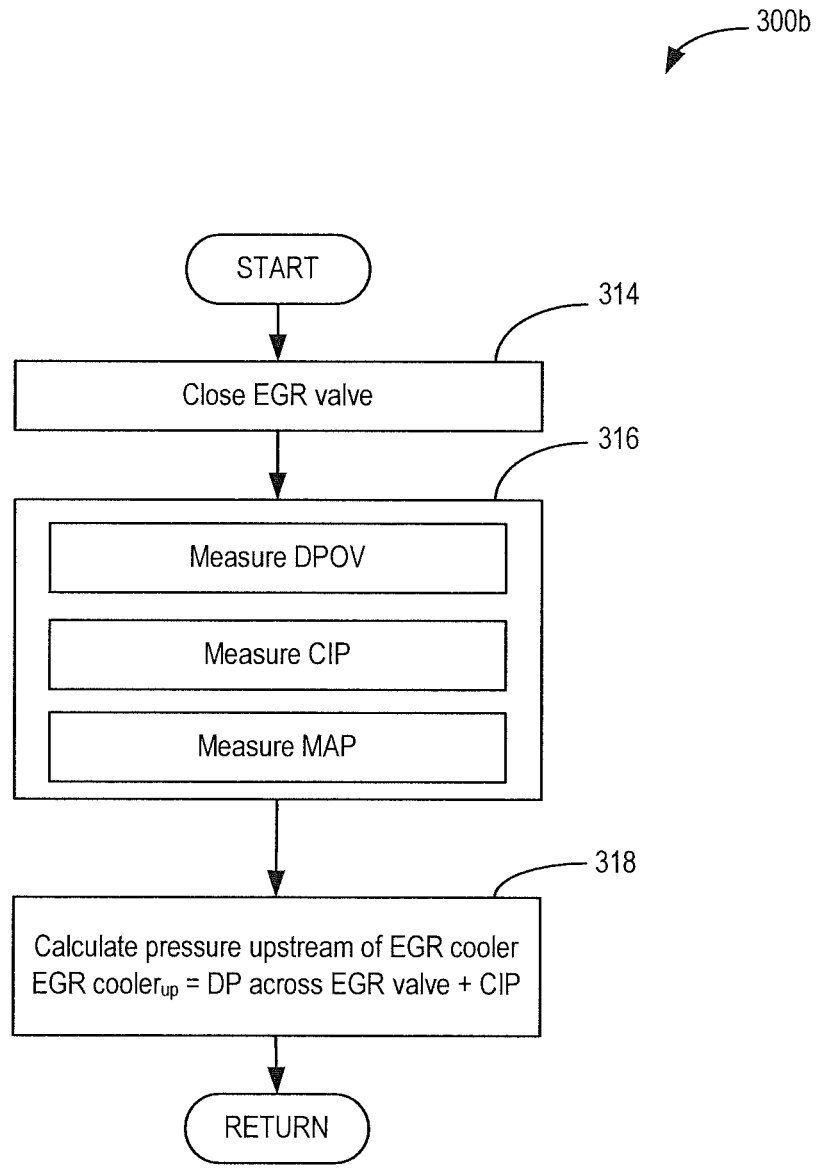
FIG. 3B shows a flow chart illustrating a routine for determining pressure upstream of the EGR cooler utilizing a delta pressure over valve (DPOV) system.
Figure 3C:
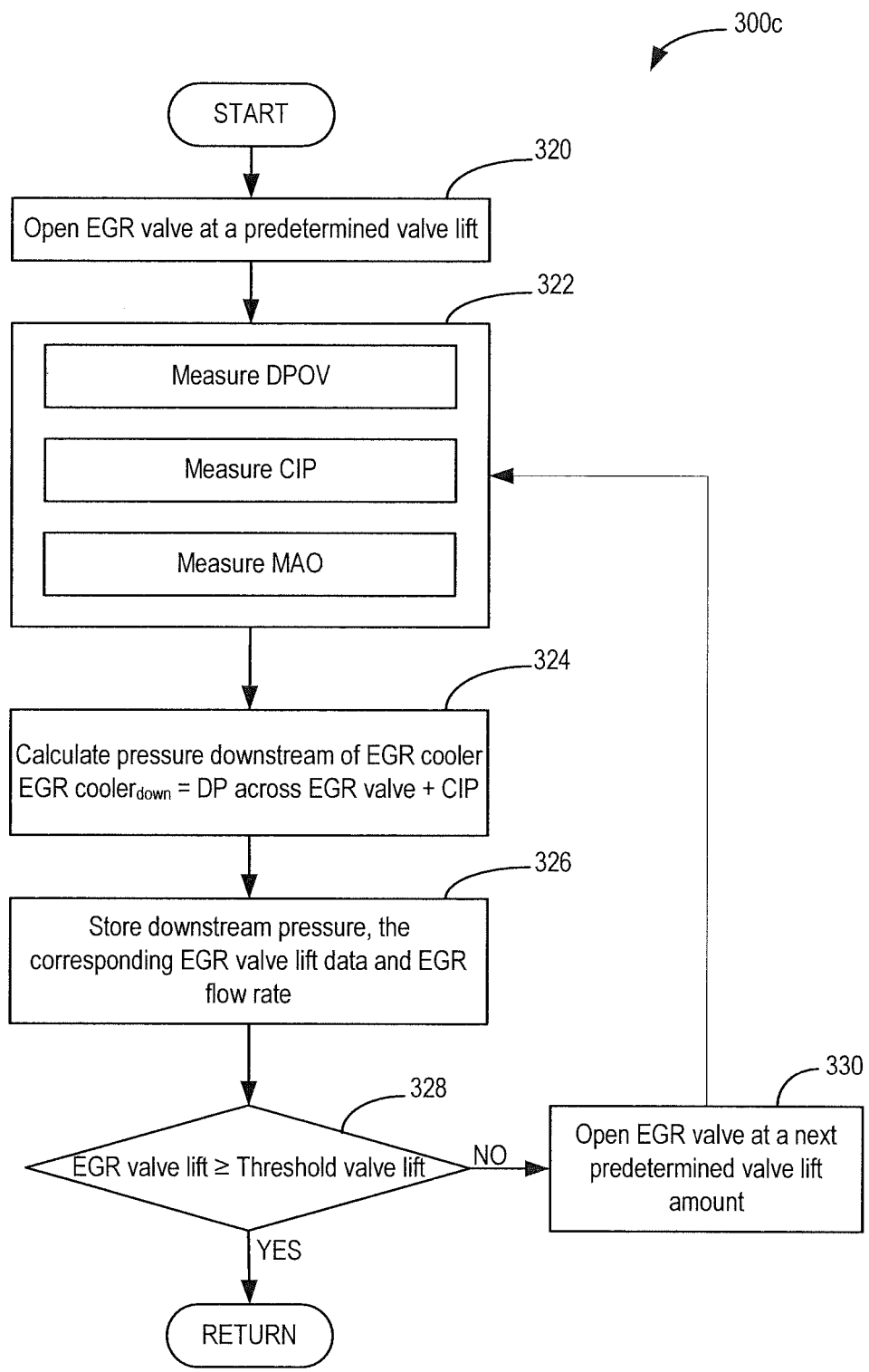
FIG. 3C shows a flow chart illustrating a routine for determining pressure downstream of the EGR cooler utilizing a DPOV system.
Figure 3D:
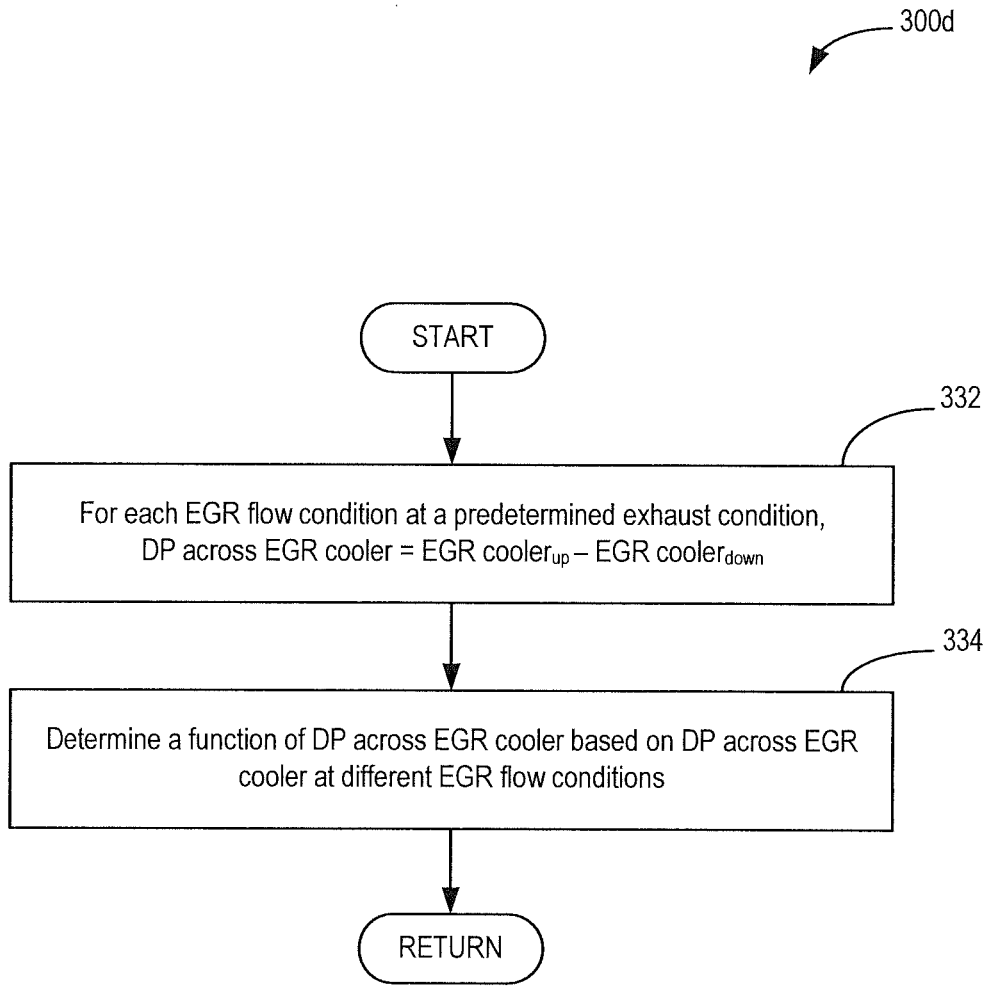
FIG. 3D shows a flow chart illustrating a routine for determining differential pressure across the EGR cooler.

Turning to FIG. 3A, it shows a routine 300a for determining and indicating EGR cooler fouling based on differential pressure across an EGR cooler such as the EGR cooler depicted at 113 at FIGS. 1 and 2 when EGR is flowing, and based on compressor inlet pressure (CIP). Alternatively, if the EGR cooler is a high pressure EGR cooler, such as EGR cooler 212 shown in FIG. 1, the routine 300a may determine and indicate EGR cooler fouling based on intake manifold pressure (MAP). The differential pressure across the EGR cooler may be based on differential pressure across the EGR valve and either compressor inlet pressure or MAP (based on the corresponding EGR system) measured both with and without EGR flow. For example, during a condition with no EGR flow (e.g., the EGR valve is fully closed and sealed), the compressor inlet pressure or MAP at that condition is used in combination with the differential pressure at across the valve at that condition to estimate an exhaust pressure upstream of the EGR cooler. Then, during a different condition with EGR flow, the compressor inlet pressure or MAP at that condition is used in combination with the differential pressure at across the valve at that condition, along with the previously estimated exhaust pressure, to determine cooler pressure drop, as a function of the amount of EGR flow. Determination of EGR cooler fouling may be performed during routine maintenance, periodic intrusive testing, or during prior normal operating conditions suitable for testing, for example, the pressure upstream of the cooler can be learned when EGR is being disabled for purge or PCV detection or CBV opening events.

At 302, the controller may determine EGR cooler inlet pressure upstream of the EGR cooler based on differential pressure (DP) across EGR valve, and a pressure downstream of the EGR valve during closed EGR valve condition at a predetermined exhaust condition. The pressure may be CIP if the EGR cooler is positioned in a LP EGR system and the pressure may be MAP if the EGR cooler is positioned in a HP EGR system. For example, the predetermined exhaust condition may be established at a specific engine speed/load point or exhaust flow rate. Details of determination of EGR cooler inlet pressure upstream of EGR cooler will be further elaborated at FIG. 3B. Next, at 304, the controller may determine EGR cooler outlet pressure downstream of EGR cooler at different EGR flow conditions (obtained by varying an amount of EGR valve lift) while maintaining the predetermined exhaust condition of step 302. For example, EGR cooler outlet pressure downstream of the EGR cooler may be determined based on DP across EGR valve and the pressure downstream of the EGR valve (e.g., CIP or MAP) at different EGR flow conditions. Details of determination of EGR cooler outlet pressure downstream of EGR cooler will be further elaborated at FIG. 3C.

Upon determining EGR cooler inlet pressure and outlet pressures, at 306, a function of DP across the EGR cooler may be determined. Determination of the function of DP across the EGR cooler will be further elaborated at FIG. 3D. For example, function of DP across the EGR cooler may be determined based on DP across the EGR cooler at different EGR flow conditions. In one example, different EGR flow conditions may be obtained by adjusting an opening of the EGR valve (that is, EGR valve lift amount).

Next, at 308, based on the determined function of DP across EGR cooler, a change in DP across the EGR cooler may be determined. For example, at the predetermined exhaust condition discussed at step 302, a function of DP across a new EGR cooler may be determined. Based on the functions of DP across the EGR cooler and the new EGR cooler, a change in DP across the EGR cooler may be determined.

Next, at 310, upon determining the change in differential pressure across the EGR cooler, it may be determined if the change in differential pressure across the EGR cooler is greater than a threshold pressure change. The threshold pressure change may be based on a pre-determined threshold indicating significant blockage of the cooler passages. If yes, at 312, EGR cooler fouling may be determined. Upon determining EGR cooler fouling, a vehicle operator may be notified regarding EGR cooler fouling (via an on-board display, for example). If the change in differential pressure is not greater than the threshold pressure change, EGR cooler fouling may not be indicated.

In one example, based on the change in DP across the EGR cooler, an efficiency of the EGR cooler may be determined. For example, as the change in DP across the EGR cooler increases, efficiency of the EGR cooler decreases. If the efficiency is lower than a threshold efficiency, EGR cooler fouling may be indicated.

In this way, EGR cooler fouling (in other words, EGR cooler degradation) may be indicated based on DP across the EGR cooler during EGR flow, the differential pressure based on compressor inlet pressure readings (if the EGR cooler is in a LP EGR system) or MAP (if the EGR cooler is in a HP EGR system) with and without EGR flow.

Turning to FIG. 3B, it shows a routine 300b for determining EGR cooler inlet pressure. In other words, routine 300b may be executed by the controller for determining pressure upstream of the EGR cooler. EGR cooler inlet pressure may be determined based on DP across the EGR valve and CIP, for example (if the EGR system is a low pressure EGR system). In other example, the EGR cooler inlet pressure may be determined based on DP across the EGR valve and MAP (if the EGR system is a high pressure EGR system or naturally aspirated EGR system).

At 314, EGR valve may be closed. For example, controller 12 may send a signal to EGR valve signaling the EGR valve to close. By closing the EGR valve, EGR flow through the EGR passage may be stopped. Consequently, when EGR is not flowing, there may be no differential pressure across the EGR cooler. In other words, pressure at the EGR passage between the turbo outlet location and an upstream location of the EGR valve, the passage comprising an EGR cooler, may be constant. Therefore, when EGR is not flowing, pressure downstream of the EGR cooler may be equal to the pressure upstream of the EGR cooler, which may be equal to the exhaust back pressure at the turbo outlet location.

Next, at 316, upon closing the EGR valve, the controller may determine DP across the EGR valve based on DPOV sensor output. Further, the controller may determine CIP based on signal from the CIP sensor located upstream of the compressor or MAP based on a signal from the MAP sensor located in the intake manifold. CIP or MAP may be the same as pressure downstream of the LP EGR valve or HP EGR valve, respectively (also known as the EGR valve outlet pressure).

Upon measuring DP across the EGR valve and CIP and/or MAP, the routine may proceed to 318 to calculate pressure upstream of the EGR cooler (EGR cooler$_{up}$). EGR cooler$_{up}$ may be calculated based on DP across the EGR valve and CIP (or MAP) when EGR is not flowing. That is, EGR cooler$_{up}$=DP across the EGR valve+CIP (for a LP EGR system, for example) or EGR cooler$_{up}$=DP across the EGR valve+MAP (for a HP EGR system, for example)

Therefore, for a predetermined wastegate opening or AIS throttle opening, pressure upstream of EGR cooler may be determined by adding DP across the EGR valve measurement to the EGR valve outlet pressure (CIP or MAP measurement) when EGR is not flowing. Upon determining EGR cooler$_{up}$, the routine may return to step 304 of FIG. 3A.

In this way, pressure upstream of the EGR cooler may be determined based on DP across EGR valve and the pressure downstream from the EGR valve (e.g., CIP or MAP) when the EGR valve is closed. By utilizing the DPOV sensor of the DPOV measurement system, the CIP sensor, and/or the MAP sensor, additional sensors for estimating EGR cooler$_{up}$ may be reduced, thereby reducing the cost for a system for determining EGR cooler degradation.

Next, turning to FIG. 3C, it shows a routine 300c for determining EGR cooler outlet pressure. In other words, routine 300c may be executed by the controller for determining pressure downstream of the EGR cooler. EGR cooler outlet pressure may be determined based on DP across the EGR valve and the pressure downstream from the EGR valve (CIP or MAP, as described above), for example.

At 320, the EGR valve may be opened at a predetermined valve lift amount. By opening the EGR valve, EGR may flow through the LP EGR passage from a location downstream of the turbine to a location upstream of the compressor. Consequently, EGR may flow through the EGR cooler located at the LP EGR passage upstream of the EGR valve. LP EGR passage is indicated at 197, and EGR cooler is indicated at 113 at FIGS. 1 and 2. When EGR flows through the EGR cooler, differential pressure across the EGR cooler may develop. For example, when exhaust gases pass through the EGR cooler, unburned hydrocarbon and fuel in the exhaust gases may accumulate in the EGR cooler causing build-up of soot in the EGR cooler. Consequently, pressure at an inlet port of the EGR cooler may be higher than the pressure at an outlet port of the EGR cooler causing differential pressure across EGR cooler. The method at 320 may also be performed in the HP EGR passage with EGR flowing from a location upstream of the turbine to a location downstream of the compressor.

Upon opening the EGR valve, at 322, DP across EGR valve and CIP (and/or MAP if the EGR system is a HP EGR system) may be measured. As discussed previously at FIG. 3B, controller may determine DP across the EGR valve based on signal from the DPOV sensor that measures a pressure difference between an upstream location and a downstream location of the EGR valve. Further, controller may determine CIP and/or MAP based on signal from the CIP sensor and/or MAP sensor, respectively, located downstream of the EGR valve (LP or HP EGR valve, respectively).

Next, at 324, pressure downstream of the EGR cooler (EGR cooler$_{down}$) may be calculated based on DP across the EGR valve and the pressure downstream from the EGR valve when EGR is flowing. That is, EGR cooler$_{down}$=DP across the EGR valve+CIP (for the LP EGR system)

EGR cooler$_{down}$=DP across the EGR valve+MAP (For the HP EGR system)

Therefore, at a predetermined EGR valve lift amount, when EGR is flowing through the EGR cooler, pressure downstream of the EGR cooler (that is, EGR cooler outlet pressure) may be determined by adding DP across the EGR valve and the pressure downstream from the EGR valve (e.g., CIP or MAP).

Next, upon determining EGR cooler$_{down}$, at 326, the controller may store the downstream EGR cooler pressure, the corresponding EGR valve lift amount, and EGR mass flow rate ($\dot{m}_{EGR}$) in a PCM data map. In one example, EGR mass flow rate ($\dot{m}_{EGR}$) may be defined as a function of an area of the opening (A), a temperature of the EGR flow ($T_{EGR}$), a differential pressure across the valve (DP), and a pressure downstream of the EGR valve ($P_d$). That is, $\dot{m}_{EGR}=f((A),(T_{EGR}),(P_d),(DP))$ Next, at 328, the controller may determine if the EGR valve lift, EGR mass flow rate or EGR percentage amount is greater than a threshold amount. If at 328, the EGR valve lift, flow rate or percentage amount is not greater than the threshold amount, the routine may proceed to 330. At 330, the controller may open the EGR valve at a next predetermined valve lift, flow rate or percentage EGR amount. Subsequently, the routine may proceed to 322 to measure DP across the EGR valve and CIP or MAP at the next predetermined valve lift, flow rate or percentage EGR amount. As discussed above, based on DP across the EGR valve and CIP or MAP, EGR cooler$_{down}$ may be estimated. Further, the determined EGR cooler$_{down}$, corresponding valve lift, flow rate or percentage EGR amount, and EGR mass flow rate at the corresponding valve lift amount may be stored in the PCM data map.

Returning to 328, if the EGR valve lift, flow rate or percentage EGR amount is greater than the threshold valve lift amount, the routine may return to step 306 at FIG. 3A.

In this way, pressure downstream of EGR cooler may be determined based on DP across EGR valve and CIP or MAP. Further, by adjusting the EGR valve lift, flow rate or percentage EGR amount, pressure downstream of EGR cooler may be determined at different EGR flow conditions. Utilizing the DP sensor, the CIP sensor, and/or the MAP sensor to determine pressure downstream of EGR cooler provides a method for determining EGR cooler degradation without implementing additional sensors and connections. Therefore, cost for EGR system may be reduced.

Turning to FIG. 3D, it shows a routine 300d for determining a function of DP across the EGR cooler.

At 332, DP across the EGR cooler may be determined based on pressure upstream of the EGR cooler and pressure downstream of the EGR cooler. That is, Differential pressure across the EGR cooler=EGR cooler$_{up}$−EGR cooler$_{down}$ Differential pressure across the EGR cooler may be determined at a predetermined exhaust condition for each EGR flow condition (that is, for each predetermined valve lift, EGR flow or percentage EGR amount).

In this way, differential pressure across EGR cooler may be determined at different EGR flow conditions by adjusting EGR valve lift, EGR flow or percentage EGR conditions for a given predetermined exhaust condition.

In one example, differential pressure across the EGR cooler may be determined at different EGR flow conditions by adjusting the valve lift, EGR mass flow or percentage EGR amount. Different exhaust conditions may also be established by moving to a different engine operating point. As discussed above, based on the determined pressure upstream and downstream of the EGR cooler, differential pressure across the EGR cooler may be determined. Further, the determined DP across the EGR cooler for each valve lift, EGR flow or % EGR and exhaust flow combination may be stored in the PCM data map.

Next, at 334, based on the determined DP across the EGR cooler at different EGR flow conditions, a function of differential pressure across the EGR cooler may be determined. In other words, differential pressure across the EGR cooler may be determined as a function of EGR mass flow rate ($\dot{m}_{EGR}$). That is, for a predetermined exhaust condition, Differential pressure across EGR cooler=$f(\dot{m}_{EGR})$ Upon determining the function of differential pressure across EGR cooler, the routine may return to step 308 at FIG. 3A. As discussed at FIG. 3A, based on the determined function of DP across the EGR cooler, a change in DP across the EGR cooler compared to DP across a new EGR cooler may be determined. Based on the change in DP across the EGR cooler being greater than a threshold pressure change, EGR cooler fouling may be indicated.

In one example, FIGS. 3A-3D provide a method for an engine comprising at a predetermined exhaust condition, determining an EGR cooler inlet pressure based on a first differential pressure across an EGR valve and a first compressor inlet pressure; at the predetermined exhaust condition, determining an EGR cooler outlet pressure based on a second differential pressure across the EGR valve and a second compressor inlet pressure; and determining a pressure loss across an EGR cooler based on the EGR cooler inlet pressure and the EGR cooler outlet pressure. The predetermined exhaust condition may be based on different engine speed/load or exhaust flow operating points. Further, a change in the pressure loss across the EGR cooler based on a pressure loss across a new EGR cooler, and a fouling state of the EGR cooler based on the change in pressure loss across the EGR cooler may be determined. The fouling state of the EGR cooler may be based on a change in an efficiency of the EGR cooler, the change in the efficiency of the EGR cooler based on the change in pressure loss across the EGR cooler.

Further, the first differential pressure across the EGR valve and the first compressor inlet pressure may be determined when the EGR valve is closed, and the second differential pressure across the EGR valve and the second compressor inlet pressure is determined when the EGR valve is opened at a predetermined EGR valve lift amount.

The method may further comprise determining the pressure loss across the EGR cooler during one or more EGR flow conditions, wherein the one or more EGR flow conditions may be based on varying an EGR valve lift, EGR mass flow or % EGR amount.

Next, turning to FIG. 4, it shows example EGR cooler degradation determination based on differential pressure across EGR cooler at different EGR flow conditions as described at FIGS. 3A-3D. Specifically, graph 400 shows position of AIS throttle (that is, an amount of AIS throttle opening) at plot 402, position of EGR valve (that is, an amount of EGR valve lift) at plot 404, threshold EGR valve lift amount at 406, differential pressure (DP) across a EGR cooler whose degradation state is being determined at plot 408, DP across a new EGR cooler at plot 410, and DP across an EGR valve at plot 412. The graph is plotted with time along x-axis. In the example shown in FIG. 4, the EGR cooler may be a LP EGR cooler in a LP EGR system. As such, the pressure downstream of the LP EGR valve may be CIP. However, in alternate embodiments the EGR cooler may be a HP EGR cooler in a HP EGR system wherein the pressure downstream of the HP EGR valve may be MAP.

Prior to t1, the AIS throttle may be closer to a fully closed position than a fully open position (plot 402), and the EGR valve may be closed (plot 404). When the EGR valve is closed, EGR may not flow through the EGR cooler and consequently, there may be no pressure drop across the EGR cooler. In other words, DP across the EGR cooler may be zero (plot 408). That is, pressure upstream of the EGR cooler is equal to pressure downstream of the EGR cooler. Further, since EGR valve is closed and AIS throttle is more closed, DP across EGR valve may be at a highest pressure (plot 412).

Next, between t1 and t2, the AIS throttle may continue to remain more closed (plot 402), and the EGR valve may be opened at a first predetermined valve lift, EGR mass flow or percentage EGR (% EGR) amount (plot 404). Consequently, EGR may flow through the EGR cooler located in the EGR passage. When EGR flows through the EGR cooler, due to accumulation of soot in the EGR cooler, there may be pressure drop across the EGR cooler. Consequently, DP across the EGR cooler may increase (plot 408). However, during similar exhaust and EGR valve lift, EGR flow or % EGR conditions (that is, when AIS throttle is more closed, and when EGR valve is opened at a first predetermined valve lift, EGR flow or % EGR amount), an increase in differential pressure across the new EGR cooler (plot 410) may be less than the increase in differential pressure across the EGR cooler whose degradation state is being determined (plot 408). Further, due to opening of the EGR valve, DP across the EGR valve may decrease (plot 412).

Next, between t2 and t3, and between t3 and t4, the AIS throttle may remain more closed, and the EGR valve may be opened at a second and a third predetermined valve lift, EGR mass flow or % EGR amount until the EGR valve lift, EGR mass flow or % EGR amount reaches or exceeds a threshold amount (406). Due to increased opening of EGR valve, EGR flow may increase and consequently, DP across the EGR cooler may increase (plot 408), and DP across the EGR valve may decrease (plot 412). DP across the new EGR cooler may also increase (plot 410) but the increase in DP across the new EGR cooler may be less than the increase in DP across the EGR cooler.

Taken together, between t0 and t4, DP across the EGR cooler (plot 408) and DP across the new EGR cooler (plot 410) may be determined at different EGR flow conditions (based on EGR valve lift, EGR flow or % EGR amount—plot 404) for a predetermined AIS throttle opening (that is, AIS throttle more closed condition—plot 402).

Next, between t4 and t8, the AIS throttle may be opened at a second predetermined AIS throttle opening amount (plot 402), and EGR valve lift, flow or % EGR amount may be varied (plot 404) until the threshold amount (e.g., threshold amount of valve lift, flow, or % EGR) is reached or exceeded. For example, between t4 and t5, EGR valve may be closed, between t5 and t6, t6 and t7, and t7 and t8, EGR valve may be opened at the first, second, and third predetermined EGR valve lift, EGR flow, or % EGR amounts respectively. Further, DP across the EGR cooler (plot 408), and DP across the new EGR cooler (plot 410) may be determined at the different EGR flow conditions (based on the EGR valve lift, flow or % EGR amount) for the AIS throttle opening at the second predetermined AIS throttle opening amount.

Next, between t8 and t11, the AIS throttle may be opened at a third predetermined AIS throttle opening amount and EGR valve lift, EGR flow, or % EGR amount may be varied (plot 404) until the threshold amount is reached or exceeded. Further, DP across the EGR cooler (plot 408), and DP across the new EGR cooler (plot 410) may be determined at the different EGR valve lift, EGR flow or % EGR conditions for the AIS throttle opening at the third predetermined AIS throttle opening amount.

As discussed above with respect to time points between t0 and t4, during the second and the third predetermined AIS throttle opening conditions (that is, between t4 and t8, and between t8 and t11), an increase in DP across the EGR cooler for each EGR flow condition may be greater than an increase in DP across the new EGR cooler.

Further, upon opening the AIS throttle, compressor inlet pressure may decrease. Consequently, for the same valve lift amount (such as between t1 and t2, between t5 and t6, and between t9 and t10, for example), DP across EGR cooler may be higher during the more closed AIS throttle condition compared to DP across EGR cooler during the second predetermined AIS throttle opening amount, which may be higher than the DP across EGR cooler during the third predetermined AIS throttle opening amount. The third predetermined AIS throttle opening amount may be greater than the second predetermined AIS throttle opening amount. Similarly, for the same EGR valve lift amount, DP across EGR valve during the more closed AIS throttle condition may be greater than the DP across EGR valve during the second AIS throttle opening amount condition, and the DP across EGR valve during the second AIS throttle opening amount condition may be greater than the DP across EGR valve during the third AIS throttle opening condition.

In this way, DP across the EGR cooler and DP across the new EGR may be determined during different EGR flow conditions by adjusting the AIS throttle opening and the EGR valve lift, EGR flow or % EGR amount. A change in the differential pressure across the EGR cooler compared to the new EGR cooler may indicate a change in efficiency of the EGR cooler. Upon determining the efficiency of the EGR to be below a threshold efficiency, EGR cooler fouling or degradation may be indicated.

In this way, EGR cooler fouling may be determined by utilizing the DPOV measurement, which includes measuring DP across the EGR valve, and CIP. It should be noted that in the case of HP EGR or naturally aspirated engine EGR, the MAP sensor can take the place of the CIP sensor. By utilizing DPOV sensor and CIP sensor to determine pressures upstream and downstream of the EGR cooler, additional sensors such as a separate DP sensor for EGR cooler, may not be required. Consequently, cost for implementation of the EGR cooler system and for testing degradation of EGR cooler may be reduced.

As one embodiment, a method for an engine includes indicating degradation of an exhaust gas recirculation (EGR)

cooler based on differential pressure across the EGR cooler during EGR flow, the differential pressure a based on pressure readings downstream of an EGR valve with and without EGR flow. The differential pressure is further based on differential pressures across the EGR valve with and without EGR flow.

The differential pressure is further based on an upstream EGR cooler pressure and a downstream EGR cooler pressure, the upstream EGR cooler pressure based on a differential pressure across the EGR valve and the pressure reading downstream of the EGR valve when EGR is not flowing and the downstream EGR cooler pressure based on a differential pressure across the EGR valve and the pressure readings downstream of the EGR valve when EGR is flowing.

The indicating degradation of the EGR cooler is further based on a change in differential pressure across the EGR cooler greater than a threshold pressure change. The change in differential pressure is based on a differential pressure across a new EGR cooler. In another example, the change in differential pressure is based on a differential pressure across an un-fouled EGR cooler.

In one example, the EGR cooler is a low pressure EGR cooler positioned within a low pressure EGR system and the pressure readings downstream of the EGR valve are compressor inlet pressure readings. In another example, the EGR cooler is a high pressure EGR cooler positioned within a high pressure EGR system and the pressure readings downstream of the EGR valve are intake manifold pressure readings.

As another embodiment, the engine system may include both a HP EGR system with a HP EGR cooler and HP EGR valve and a LP EGR system with a LP EGR cooler and LP EGR valve. In this embodiment, both EGR coolers may be diagnosed for degradation (e.g., fouling) using similar methods as those described above. In one example, when the engine is boosted EGR may be provided to the engine with the LP EGR system. When the engine is not boosted, EGR may be provided to the engine with the HP EGR system. Thus, a method for an engine including both a HP EGR system and a LP EGR system may include indicating degradation of a LP EGR cooler based on a differential pressure across the LP EGR cooler during LP EGR flow, the differential pressure based on a compressor inlet pressure (CIP) and a differential pressure across the LP EGR valve with and without LP EGR flow. The method further includes indicating degradation of the HP EGR cooler based on a differential pressure across the HP EGR cooler during HP EGR flow, the differential pressure based on an intake manifold pressure (MAP) and a differential pressure across the HP EGR valve with and without HP EGR flow.

During boosted engine operation, the LP EGR valve may be open and the HP EGR valve may be closed, thereby resulting in LP EGR flowing and HP EGR not flowing to the intake manifold. Thus, during a first condition when the engine is boosted, the method may include flowing LP EGR through the LP EGR system (the LP EGR system including the LP EGR cooler and LP EGR valve), not flowing EGR through the HP EGR system (the HP EGR system including the HP EGR cooler and the HP EGR valve), determining upstream pressure of the HP EGR cooler based on MAP and the differential pressure across the HP EGR valve. Further, during boosted operation, the method may include determining downstream pressure of the LP EGR cooler based on differential pressure across the LP EGR valve and CIP. Further still, during the first condition, the method may include indicating degradation of the LP EGR cooler based on the upstream pressure and downstream pressure of the LP EGR cooler.

During non-boosted engine operation, the LP EGR valve may be closed and the HP EGR valve may be open, thereby resulting in LP EGR not flowing and HP EGR flowing to the intake manifold. Thus, during a second condition when the engine is not boosted, the method may include flowing HP EGR through the HP EGR system, not flowing EGR through the LP EGR system, determining upstream pressure of the LP EGR cooler based on CIP and the differential pressure across the LP EGR valve. Further, during non-boosted operation, the method may include determining downstream pressure of the HP EGR cooler based on the differential pressure across the HP EGR cooler and MAP. Further still, during the second condition, the method may include indicating degradation of the HP EGR cooler based on the upstream pressure and downstream pressure of the HP EGR cooler.

More specifically, the method may include determining the differential pressure across the LP EGR cooler based on the determined upstream LP EGR cooler pressure and downstream LP EGR cooler pressure. Likewise, the method includes determining the differential pressure across the HP EGR cooler based on the determined upstream HP EGR cooler pressure and downstream HP EGR cooler pressure. The method may further include indicating degradation of the LP EGR cooler if the differential pressure across the LP EGR cooler is greater than a threshold pressure change. Likewise, the method may include indicating degradation of the HP EGR cooler if the differential pressure across the HP EGR cooler is greater than the threshold pressure change, the threshold pressure change based on a differential pressure across a new (or un-fouled) EGR cooler.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting an exhaust gas recirculation (EGR) valve arranged downstream of an EGR cooler to an open position and receiving a first pressure reading from a sensor downstream of the EGR valve and a first differential pressure reading across the EGR valve from a differential pressure sensor across the EGR valve, the first pressure reading and the first differential pressure reading taken with EGR flow;
adjusting the EGR valve to a closed position and receiving a second pressure reading from the sensor downstream of the EGR valve and a second differential pressure reading across the EGR valve from the differential pressure sensor, the second pressure reading and the second differential pressure reading taken without EGR flow;
determining an upstream EGR cooler pressure based on a comparison between the second differential pressure reading across the EGR valve and the second pressure reading downstream of the EGR valve;
determining a downstream EGR cooler pressure based on a comparison between the first differential pressure reading across the EGR valve and the first pressure reading downstream of the EGR valve;
determining a differential pressure across the EGR cooler based on a comparison between the upstream and downstream EGR cooler pressures; and
indicating degradation of the EGR cooler based on the differential pressure across the EGR cooler,
wherein the engine does not include a differential pressure sensor over the EGR cooler.

2. The method of claim 1, wherein the indicating degradation of the EGR cooler is performed in response to a change in differential pressure across the EGR cooler greater than a threshold pressure change, the change in differential pressure based on a differential pressure across a new EGR cooler.

3. The method of claim 1, wherein the EGR cooler is a low pressure EGR cooler positioned within a low pressure EGR system and wherein the sensor is a compressor inlet pressure sensor.

4. The method of claim 1, wherein the EGR cooler is a high pressure EGR cooler positioned within a high pressure EGR system and wherein the sensor is an intake manifold pressure sensor.

5. The method of claim 1, further comprising:
during a first condition when the engine is boosted, flowing low pressure EGR through a low pressure EGR system including a low pressure EGR cooler and a low pressure EGR valve, not flowing EGR through a high pressure EGR system including a high pressure EGR cooler and a high pressure EGR valve, determining a downstream pressure of the low pressure EGR cooler based on a comparison between a differential pressure across the low pressure EGR valve and a compressor inlet pressure, determining an upstream pressure of the high pressure EGR cooler based on a comparison between an intake manifold pressure and a differential pressure across the high pressure EGR valve; and
during a second condition when the engine is not boosted, flowing high pressure EGR through the high pressure EGR system, not flowing low pressure EGR through the low pressure EGR system, determining an upstream pressure of the low pressure EGR cooler based on the comparison between the compressor inlet pressure and the differential pressure across the low pressure EGR valve, determining a downstream pressure of the high pressure EGR cooler based on a comparison between the differential pressure across the high pressure EGR valve and the intake manifold pressure;
indicating degradation of the high pressure EGR cooler based on a comparison between the upstream pressure and the downstream pressure of the high pressure EGR cooler; and
indicating degradation of the low pressure EGR cooler based on a comparison between the upstream pressure and the downstream pressure of the low pressure EGR cooler.

6. A method for an engine, comprising:
adjusting an exhaust gas recirculation (EGR) valve arranged downstream of an EGR cooler to a closed position and receiving a first differential pressure reading from a differential pressure sensor over the EGR valve and a first downstream pressure reading taken downstream of the EGR valve;
adjusting the EGR valve to an open position and receiving a second differential pressure reading from the differential pressure sensor and a second downstream pressure reading taken downstream of the EGR valve;
determining a differential pressure across the EGR cooler based on the first and second differential pressure readings and the first and second downstream pressure readings; and
indicating degradation of the EGR cooler based on the differential pressure across the EGR cooler;
wherein the first differential pressure reading and the first downstream pressure reading are taken without EGR flow, and wherein the second differential pressure reading and the second downstream pressure reading are taken with EGR flow.

7. The method of claim 6, wherein the EGR cooler is a low pressure EGR cooler in a low pressure EGR system and the first and second downstream pressure readings are compressor inlet pressure readings from a compressor inlet pressure sensor.

8. The method of claim 6, wherein the EGR cooler is a high pressure EGR cooler in a high pressure EGR system and the first and second downstream pressure readings are intake manifold pressure readings from an intake manifold sensor.

9. The method of claim 6, wherein the differential pressure across the EGR cooler is further based on a function of an outlet pressure of the EGR cooler without EGR flow and an outlet pressure of the EGR cooler with EGR flow, the outlet pressure of the EGR cooler based on the first and second differential pressure readings and the first and second downstream pressure readings.

10. The method of claim 6, further comprising indicating EGR cooler degradation based on a change in an efficiency of the EGR cooler, the change in the efficiency of the EGR cooler based on a change in differential pressure across the EGR cooler, wherein the engine does not include a differential pressure sensor over the EGR cooler.

11. The method of claim 10, wherein the change in differential pressure across the EGR cooler is based on a differential pressure across a new EGR cooler and wherein the differential pressure across the new EGR cooler is determined during one or more EGR flow conditions.

* * * * *